United States Patent
Tu et al.

(10) Patent No.: US 9,436,259 B2
(45) Date of Patent: Sep. 6, 2016

(54) ELECTRONIC DEVICE AND CONTROL METHOD

(71) Applicant: Acer Incorporated, New Taipei (TW)

(72) Inventors: Po-Jen Tu, New Taipei (TW); Jia-Ren Chang, New Taipei (TW); Ming-Chun Yu, New Taipei (TW); Ming-Chun Fang, New Taipei (TW); Kuei-Ting Tai, New Taipei (TW); Kai-Meng Tzeng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 144 days.

(21) Appl. No.: 14/328,821

(22) Filed: Jul. 11, 2014

(65) Prior Publication Data
US 2015/0055802 A1    Feb. 26, 2015

(30) Foreign Application Priority Data
Aug. 23, 2013 (TW) ............ 102130173 A

(51) Int. Cl.
| | |
|---|---|
| *H03G 3/20* | (2006.01) |
| *G06F 1/32* | (2006.01) |
| *G06F 3/16* | (2006.01) |
| *G10L 15/22* | (2006.01) |
| *H04R 3/00* | (2006.01) |

(52) U.S. Cl.
CPC ........... *G06F 1/3206* (2013.01); *G06F 1/3296* (2013.01); *G06F 3/167* (2013.01); *G10L 15/22* (2013.01); *H04R 3/00* (2013.01); *Y02B 60/1285* (2013.01)

(58) Field of Classification Search
None
See application file for complete search history.

(56) References Cited

U.S. PATENT DOCUMENTS

| | | | |
|---|---|---|---|
| 8,416,968 B2 | 4/2013 | Tsai et al. | |
| 8,810,065 B2 | 8/2014 | Browning | |
| 2005/0164631 A1* | 7/2005 | Jin | H04M 1/05 455/12.1 |
| 2009/0097674 A1* | 4/2009 | Watson | B60R 1/12 381/86 |
| 2014/0012573 A1* | 1/2014 | Hung | G06F 1/3215 704/233 |
| 2014/0156269 A1* | 6/2014 | Lee | G06F 1/3206 704/231 |
| 2014/0343949 A1* | 11/2014 | Huang | H04R 1/08 704/275 |
| 2014/0348345 A1* | 11/2014 | Furst | H04R 3/00 381/111 |

FOREIGN PATENT DOCUMENTS

| | | |
|---|---|---|
| TW | 200930003 | 7/2009 |
| TW | 201009694 | 3/2010 |
| TW | 201211753 | 3/2012 |

OTHER PUBLICATIONS

Chinese language office action dated May 26, 2015, issued in application No. TW 102130173.

* cited by examiner

*Primary Examiner* — Regina N Holder
(74) *Attorney, Agent, or Firm* — McClure, Qualey & Rodack, LLP

(57) ABSTRACT

An electronic device includes a microphone, a bias-supply device and a voice-recognition device. The bias-supply device is configured to provide a first bias voltage to serve as an operation voltage of the microphone, when the electronic device is operated in a power-saving mode, such that the microphone transforms a voice signal into a first output signal. The voice-recognition device is configured to receive the first output signal and output a control signal, when the first output signal has a predetermined signal, to enable the electronic device be operated in a normal operation mode and the bias-supply device to provide a second bias voltage that is higher than the first bias voltage to serve as the operation voltage of the microphone, such that the microphone transforms the voice signal into a second output signal and outputs the second signal to a core circuit.

11 Claims, 4 Drawing Sheets

ELECTRONIC DEVICE AND CONTROL METHOD

CROSS REFERENCE TO RELATED APPLICATIONS

This Application claims priority of Taiwan Patent Application No. 102130173, filed on Aug. 23, 2013, the entirety of which is incorporated by reference herein.

BACKGROUND OF THE INVENTION

1. Field of the Invention

The present invention relates to an electronic device, and in particular to a microphone having a power-saving mode.

2. Description of the Related Art

Recently, many electronic devices have voice-control functionality, such that the user can control the electronic device directly by voice. The electronic device with voice-control functionality allows the user to operate the electronic device conveniently and easily.

Additionally, a conventional electronic device will enter the power-saving mode (sleeping mode) to reduce power consumption after the electronic device has not received any commands for a period of time. However, the design purpose of the microphone is for receiving the user's voice, and thus the microphone is not designed to operate in the power-saving mode. When the electronic device goes into the power-saving mode, the microphone becomes the major power consuming device. Therefore, the power consumption caused by the microphone of the electronic device operating in the power-saving mode needs to be improved.

BRIEF SUMMARY OF THE INVENTION

A detailed description is given in the following embodiments with reference to the accompanying drawings.

An electronic device is disclosed. The electronic device includes a microphone, a bias-supply device and a voice-recognition device. The bias-supply device is configured to provide a first bias voltage to serve as an operation voltage of the microphone, when the electronic device is operated in a power-saving mode, such that the microphone transforms a voice signal into a first output signal. The voice-recognition device is configured to receive the first output signal and output a control signal, when the first output signal has a predetermined signal, to enable the electronic device be operated in a normal operation mode and the bias-supply device to provide a second bias voltage that is higher than the first bias voltage to serve as the operation voltage of the microphone, such that the microphone transforms the voice signal into a second output signal and outputs the second signal to a core circuit.

Another electronic device is disclosed. The electronic device includes a core circuit, a microphone, a bias-supply device, and a voice-recognition device. The core circuit has a central processor unit and a codec. The bias-supply device is configured to provide a first bias to serve as an operation voltage of the microphone when the electronic device is operated in a power-saving mode, such that the microphone transforms a voice signal into a first output signal. The voice-recognition device is configured to receive the first output signal and output a control signal, when the first output signal has a predetermined signal, to enable the electronic device be operated in a normal operation mode and the bias-supply device to provide a second bias voltage that is higher than the first bias voltage to serve as the operation voltage of the microphone. Thus, the microphone transforms the voice signal into a second output signal and outputs the second signal to the codec. The waveform of the predetermined signal is a truncated sine wave. The bias-supply device includes a first resistor, a second resistor, and a switching device. The first resistor has a first terminal coupled to a power voltage and a second terminal coupled to the voice-recognition device. The second resistor has a first terminal coupled to the power voltage and a second terminal coupled to the codec. The switching device is configured to selectively couple the first resistor or the second resistor to a power input terminal of the microphone.

A control method is disclosed. The control method includes: providing a first bias voltage to serve as an operation voltage of a microphone and to transform a voice signal into a first output signal by the microphone when an electronic device is operated in a power-saving mode; switching the operation of the electronic device from the power-saving mode to a normal operation mode, when the first output signal has a predetermined signal; providing a second bias voltage that is higher than the first bias voltage to serve as the operation voltage of the microphone and to transform the voice signal to a second output signal by the microphone, when the electronic device is operated in the normal operation mode; and outputting the second output signal to a core circuit of the electronic device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
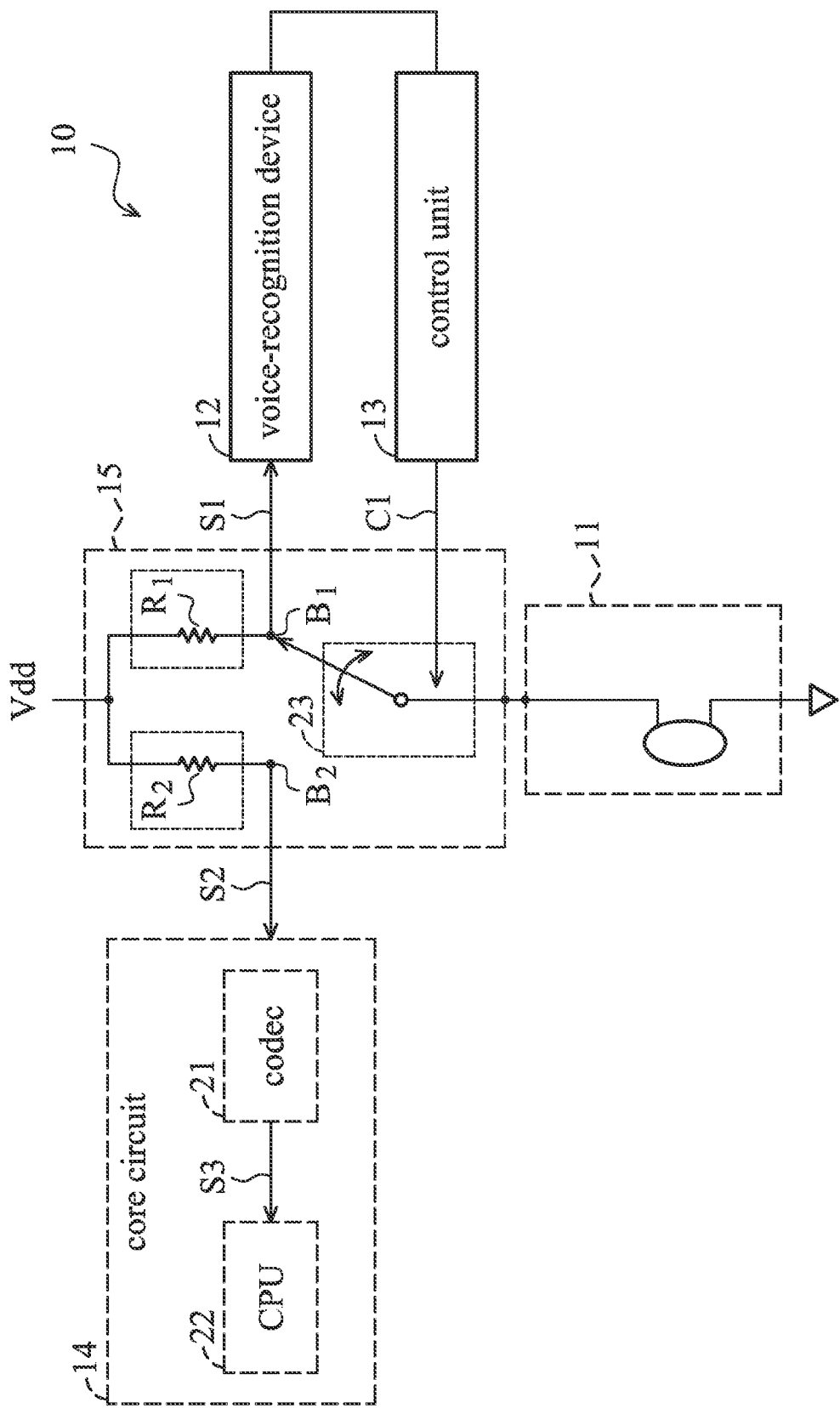
FIG. 1 is schematic diagram of the electronic device according an embodiment of the invention.

FIG. 1 is a schematic diagram of an electronic device according to an embodiment of the present invention. As shown in FIG. 1, the electronic device 10 includes a microphone 11, a voice-recognition device 12, a control unit 13, a core circuit 14 and a bias-supply device 15. For example, the electronic device 10 can be a hand-held mobile device, a smartphone or a tablet PC, but it is not limited thereto.

The microphone 11 is configured to receive a voice signal and transform the voice signal to an electrical signal (e.g., a voltage signal). For example, the microphone 11 is configured to transform the sound wave of the voice to a voltage signal. The microphone 11 can be a dynamic microphone, a condenser microphone, an electret condenser microphone, a MEMS microphone or a ribbon microphone, but it is not limited thereto.

The voice-recognition device 12 can be a digital signal processor (DSP), an analog to digital converter (ADC) or a voice-detection transistor, but it is not limited thereto. In an embodiment, when the electronic device 10 is operated in the power-saving mode, the voice-recognition device 12 is configured to receive the voltage signal (e.g., the first output signal S1) output by the microphone 11 and determine that whether the first output signal S1 of the microphone 11 has a predetermined signal. For example, when the voice-recognition device 12 receives the first output signal S1 of the microphone 11, the voice-recognition device 12 processes the received first output signal S1 for obtaining the information of the first output signal S1. In addition, the voice-recognition device 12 also compares the information of the first output signal S1 with a predetermined signal in order to determine whether the first output signal S1 has the predetermined signal, but it is not limited thereto. In an embodiment, the waveform of the predetermined signal is a truncated sine wave. In other words, when the voice-recognition device 12 determines that the first output signal S1 has the truncated sine wave, it is determined that the first output signal S1 has the predetermined signal. In an embodiment, the voice-recognition device 12 transforms the output signal (or the analog output signal) output by the microphone 11 into the digital signal, but it is not limited thereto. In another embodiment, the voice-recognition device 12 processes the analog signal output by the microphone 11 by the digital signal processor (DSP) for transforming the analog signal to the digital signal, but it is not limited thereto. In an embodiment, the information of the predetermined signal stored in the voice-recognition device 12 is "start". For example, the stored predetermined signal is in the form of the digital signal, and data of the digital signal is I10011. When the voice-recognition device 12 receives the output signal output by the microphone 11, the voice-recognition device 12 processes the output signal. After the voice-recognition device 12 processes the conversion (e.g., transforming the analog signal to the digital signal) and obtains the digital signal (e.g., 10011) having the same information with "start", it is determined that the output signal output by the microphone 11 has the predetermined signal.

The control unit 13 can be a general-purpose processor, an application processor, a digital signal processor (DSP), a micro control unit (MCU), or an embedded controller, but it is not limited thereto.

The core circuit 14 is configured to receive the voltage signal output by the microphone 11, such as the second output signal S2, and to perform the corresponding operation according to the second output signal S2 output by the microphone 11. In an embodiment, when the electronic device 10 is operated in the normal operation mode, the core circuit 14 receives the second output signal S2 output by the microphone 11, and performs the corresponding operation according to the second output signal S2. In an embodiment, the core circuit 14 includes a codec 21 and a central processor unit (CPU) 22, but it is not limited thereto. In an embodiment, the core circuit 14 includes not only the codec 21 and the CPU 22 but also the memory, but it is not limited thereto. The codec 21 is configured to encode or decode the received second output signal S2 for obtaining a codec signal S3, but it is not limited thereto. The CPU 22 operates the corresponding operation according to the codec signal S3 of the codec 21. For example, when the information of the codec signal S3 is "output image", the CPU 22 performs the relevant operation according to the instruction corresponding to the "output image". In an embodiment, the function of the voice-recognition unit device 12 is similar to the codec 21, the main difference between them is that the circuit of the voice-recognition device 12 is simpler than the codec 21, or the voice-recognition device 12 has only a part of the functions of the codec 21 (or a part of the circuit). Because the circuit of the voice-recognition device 12 is simpler than the codec 21, such that the power consumption of the voice-recognition device 12 is lower than that of the codec 21.

The bias-supply device 15 is configured to supply the bias voltage to serve as the operation voltage of the microphone 11. In an embodiment, the bias-supply device 15 includes a first resistor R1, a second resistor R2 and a switching device 23. The first resistor R1 of the bias-supply device 15 is coupled between a power voltage Vdd and the voice-recognition device 12. When the first resistor R1 is coupled to the microphone 11 by the switching device 23, the bias-supply device 15 provides a first bias voltage to the microphone 11. Specifically, the first terminal of the first resistor R1 is coupled to the power voltage Vdd, and the second terminal of the first resistor R1 is coupled to the voice-recognition device 12. The first terminal of the second resistor R2 is coupled to the power voltage Vdd, and the second terminal of the second resistor R2 is coupled to the codec 21 of the core circuit 14. In an embodiment, the switching device 23 is configured to receive the switch signal C1 from the control unit 13 for selectively providing power to the microphone 11. For example, the second terminal of the first resistor R1 is coupled to the microphone 11 for providing the first bias voltage B1 to the microphone 11, when the switching device 23 receives the switch signal C1 at a first logic level from the control unit 13. Furthermore, the second terminal of the second resistor R2 is coupled to the microphone 11 by the switching device 23 for providing a second bias voltage B2 to the microphone 11, when the switching device 23 receives a switching signal C1 at a second logic level from the control unit 13. In the present embodiment, the first resistor R1 (e.g., 10K ohms) is that is higher than the second resistor R2 (e.g., 2.2K ohms), so that the second bias voltage B2 is smaller than the first bias voltage B1.

Figure 2A:
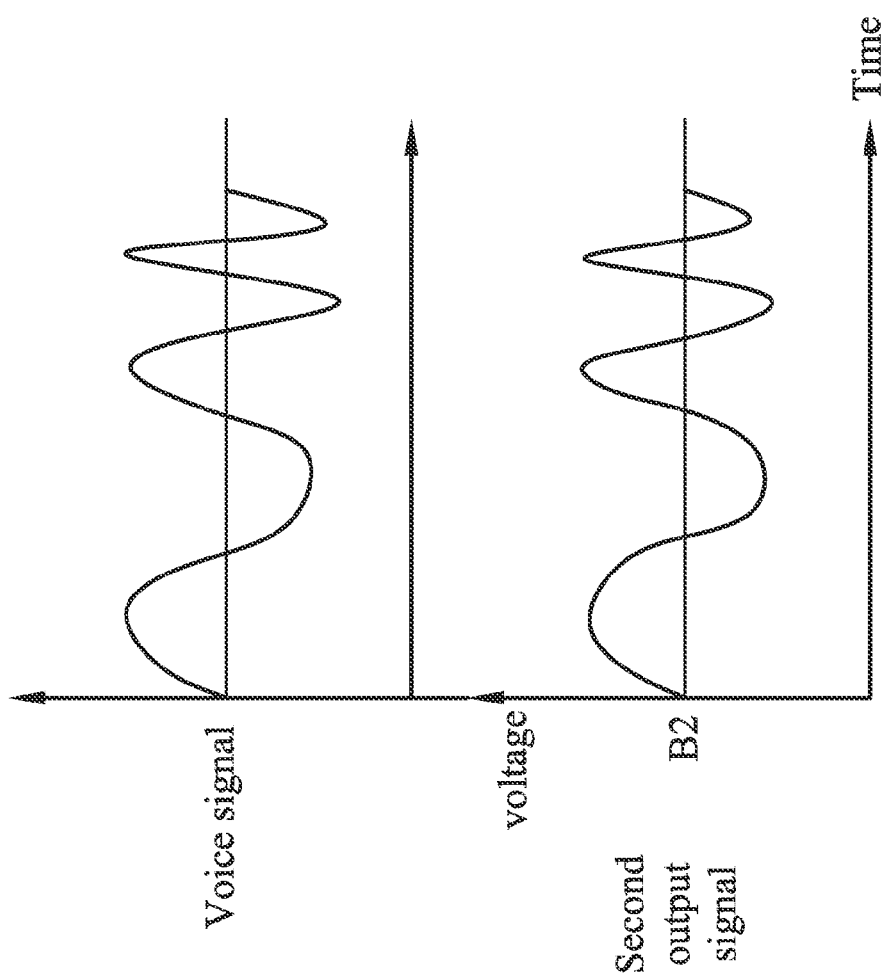
FIGS. 2A-2B are operation diagram of the electronic device according an embodiment of the invention.

FIG. 2A is an operation schematic diagram of the microphone 11 received with the second bias voltage B2 provided by the bias-supply device. As shown in FIG. 2A, the voice signal is a continuous sine wave, but it is not limited thereto. For example, the amplitudes of the voice signals can be different according to the different volumes of the voice and the frequencies of the voice signals may also differ according to the different tones of voice. In an embodiment, the microphone 11 not only transforms the voice signal to the voltage signal but also amplifies or decreases the voice signal, but it is not limited thereto.

As shown in FIG. 2A, the bias-supply device 15 provides the second bias voltage B2 to the microphone 11 and the microphone 11 transforms the voice signal (sound wave) to the second output signal S2 when the electronic device 10 operates in the normal operation mode. In an embodiment, the microphone 11 is turned on based on the second bias voltage B2 supplied by the second resistor R2. In other words, when the electronic device 10 is operated in the normal operation mode, the second bias voltage B2 is provided to the microphone 11, such that the microphone 11 is operated at the linear region, and the microphone 11 linearly transforms the voice signal to the second output signal S2.

Figure 2B:
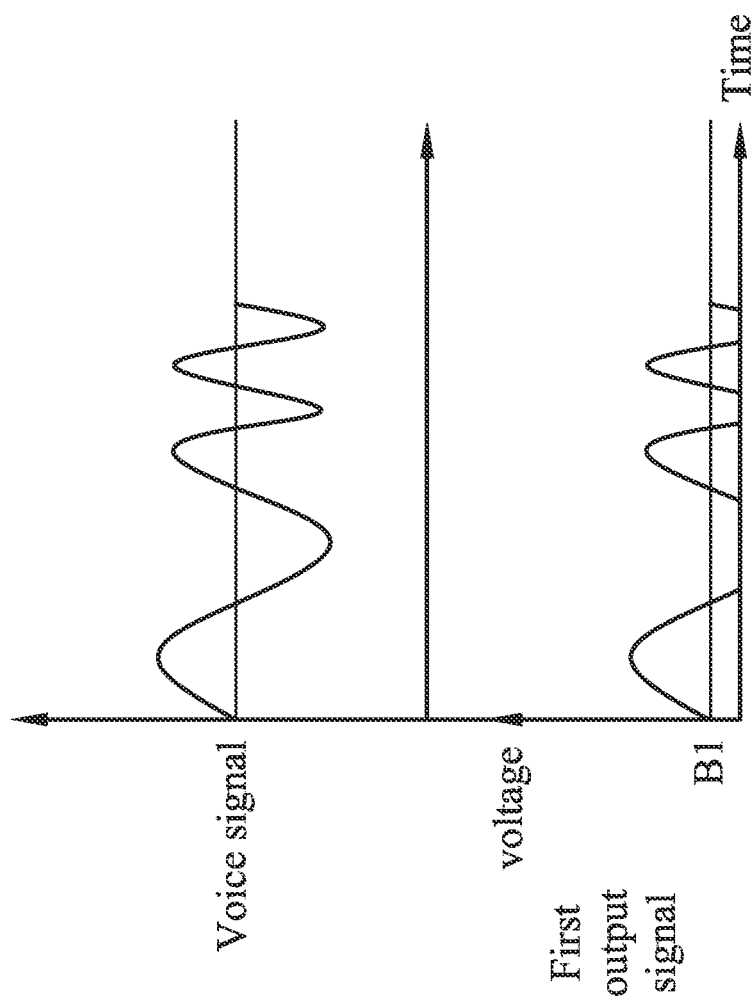

As shown in FIG. 2B, the bias-supply device 15 provides the first bias voltage B1 to the microphone 11 such that the microphone 11 transforms the voice signal (sound wave) to the first output signal S1, when the electronic device 10 operates in the power-saving mode. As shown in FIG. 2B, the first bias voltage B1 is much lower than the second bias voltage B2 such that the microphone 11 is operated at a non-linear region. Thus, the microphone 11 non-linearly transforms the voice signal to the first output signal S1 when the voice signal is transformed to the first output signal S1 by the microphone 11. For example, as shown in FIG. 2B, the sum of the first bias voltage B1 and the first output signal S1 is smaller than the operation voltage of the microphone 11 (e.g., less than zero volts) at some time, causing the microphone 11 to be turned off. When the microphone 11 is turned off, the voice signal cannot be continuously transformed to voltage signals, such that the waveform of the first output signal is the truncated sine wave as shown in FIG. 2B.

In other words, when the electronic device 10 operates in the power-saving mode, the first bias voltage B1 enables the microphone 11 to transform the voice signal to the first output signal S1 discontinuously. Namely, the first bias voltage B1 makes the microphone 11 non-linearly transform the voice signal to the first output signal S1. Furthermore, since the first resistor R1 has a much higher resistance than the second resistor R2, when the microphone 11 is operated in the power-saving mode and provided with the first bias voltage B1, the current flowing through the microphone 11 will be less than that of the microphone 11 which is provided with the second bias voltage B2 and operated in the normal operation mode.

Figure 3:
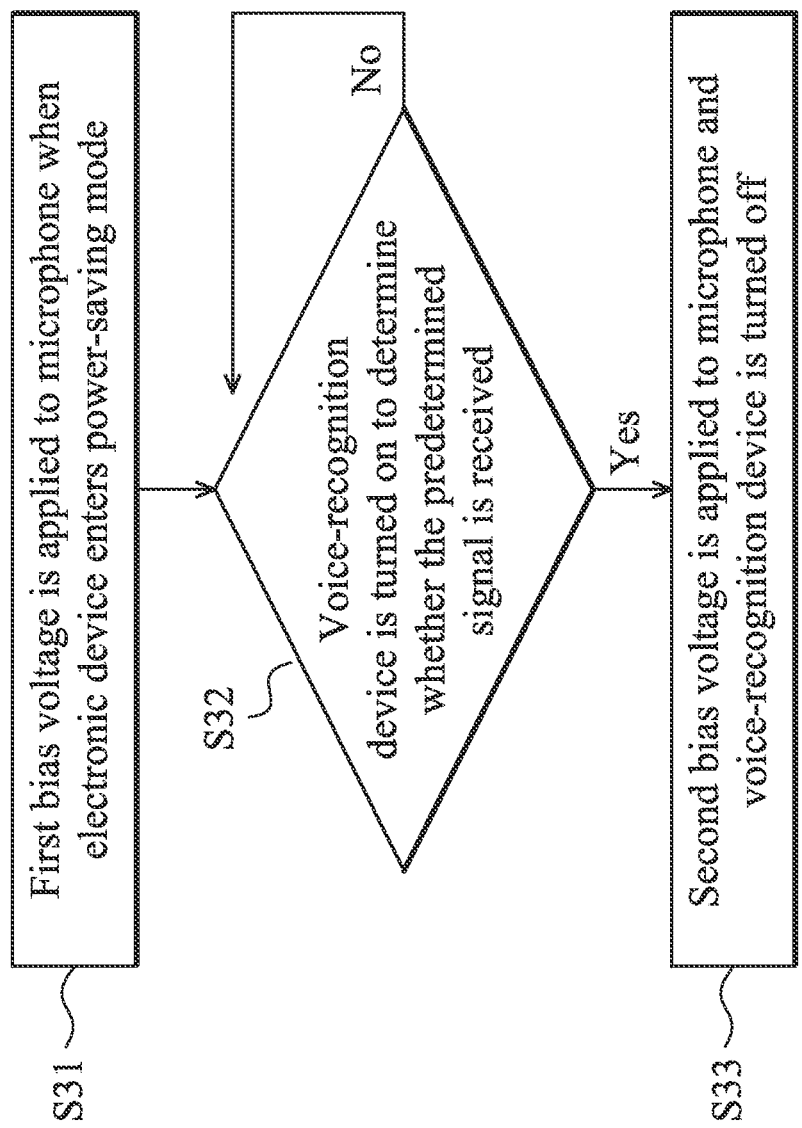
FIG. 3 is operation diagram of the electronic device according an embodiment of the invention.

FIG. 3 is a flow chart of the control method according to the present invention. The process begins in step S31; the first bias voltage B1 is applied to the microphone 11 when the electronic device 10 enters the power-saving mode, and the process goes to step S32. In an embodiment, the power consumption of the core circuit 14 is also reduced when the CPU 22 is operated in the power-saving mode, but it is not limited thereto. In step S32, the voice-recognition device 12 is turned on to determine whether the predetermined signal is received. When the first output signal S1 has the predetermined signal, the process goes to step S33. When the first output signal S1 does not have the predetermined signal S1, the process returns to step S32. For example, the voice-recognition device 12 transforms the first output signal S1 into the digital signal by the analog to digital converter, and then determines whether the first output signal S1 has the predetermined signal, but it is not limited thereto. In step S33, the control unit 13 outputs the switch signal C1 to the bias-supply device 15, such that the bias-supply device 15 provides the second bias voltage B2 to the microphone 11. The control unit 13 controls the core circuit 14 to operate in the normal operation mode and turns off the voice-recognition device 12. The detailed operations of the microphone 11, the voice-recognition device 12, the control unit 13, the core circuit 14 and the bias-supply device 15 please refer to the related operation in FIG. 1 and FIG. 2, and the details thereof are omitted for brevity.

In summary, the electronic device and the control method of the present invention can adjust the bias voltage of the microphone according to the different operation modes for decreasing the power consumption of the microphone. Thus, the power consumption of the microphone operated in the power-saving mode can be further decreased and improved.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device comprising:
   a microphone;
   a bias-supply device, configured to provide a first bias voltage to serve as an operation voltage of the microphone, when the electronic device is operated in a power-saving mode, such that the microphone transforms a voice signal into a first output signal; and
   a voice-recognition device, configured to receive the first output signal and output a control signal, when the first output signal has a predetermined signal, to enable the electronic device be operated in a normal operation mode and the bias-supply device to provide a second bias voltage that is higher than the first bias voltage to serve as the operation voltage of the microphone, such that the microphone transforms the voice signal into a second output signal and outputs the second signal to a core circuit;
   wherein the microphone non-linearly transforms the voice signal into the first output signal when the operation voltage of the microphone is the first bias voltage, and the microphone linearly transforms the voice signal into the second output signal when the operation voltage of the microphone is the second bias voltage.

2. The electronic device as claimed in claim 1, wherein the bias-supply device comprises:
   a first resistor, coupled between a power voltage and the voice-recognition device;
   a second resistor, coupled between the power voltage and the core circuit; and
   a switching device, configured to couple the first resistor to the microphone for providing the first bias voltage to the microphone, when a received switch signal is at a first logic level, and couple the second resistor to the microphone for providing the second bias voltage to the microphone when the received switch signal is at a second logic level opposite to the first logic level.

3. The electronic device as claimed in claim 2, further comprising a control unit, configured to output the switching signal at the second logic level to the switching device and the core circuit for enabling the electronic device be operated in a normal operation mode, when the control signal is received.

4. The electronic device as claimed in claim 1, wherein the bias-supply device comprises:
   a first resistor, having a first terminal coupled to a power voltage and a second terminal coupled to the voice-recognition device;
   a second resistor, having a first terminal coupled to the power voltage and a second terminal coupled to the core circuit; and
   a switching device, configured to selectively couple the second terminal of the first resistor or the second resistor to a power input terminal of the microphone.

5. The electronic device as claimed in claim 2, wherein the first resistor has a higher resistance than the second resistor.

6. The electronic device as claimed in claim 1, wherein a waveform of the predetermined signal is a truncated sine wave.

7. The electronic device as claimed in claim 1, wherein the microphone is operated in a non-linear operation region when the operation voltage of the microphone is the first bias voltage.

8. The electronic device as claimed in claim 1, wherein the microphone is operated in a linear operation region when the operation voltage of the microphone is the first bias voltage.

9. The electronic device as claimed in claim 3, wherein the control unit further outputs the switching signal at the second logic level to turn off the voice-recognition device when the control unit receives the control signal.

10. An electronic device comprising:
a core circuit, having a central processor unit and a codec;
a microphone;
a bias-supply device, configured to provide a first bias voltage to serve as an operation voltage of the microphone when the electronic device is operated in a power-saving mode, such that the microphone transforms a voice signal into a first output signal; and
a voice-recognition device, configured to receive the first output signal and output a control signal, when the first output signal has a predetermined signal, to enable the electronic device be operated in a normal operation mode and the bias-supply device to provide a second bias voltage that is higher than the first bias voltage to serve as the operation voltage of the microphone, such that the microphone transforms the voice signal into a second output signal and outputs the second signal to the codec, wherein a waveform of the predetermined signal is a truncated sine wave, wherein the microphone non-linearly transforms the voice signal into the first output signal when the operation voltage of the microphone is the first bias voltage, and the microphone linearly transforms the voice signal into the second output signal when the operation voltage of the microphone is the second bias voltage;
wherein the bias-supply device comprises:
a first resistor, having a first terminal coupled to a power voltage and a second terminal coupled to the voice-recognition device;
a second resistor, having a first terminal coupled to the power voltage and a second terminal coupled to the codec; and
a switching device, configured to selectively couple one of the first resistor and the second resistor to a power input terminal of the microphone.

11. A control method, comprising:
providing a first bias voltage to serve as an operation voltage of a microphone and to non-linearly transform a voice signal into a first output signal by the microphone, when an electronic device is operated in a power-saving mode;
switching the operation of the electronic device from the power-saving mode to a normal operation mode, when the first output signal has a predetermined signal;
providing a second bias voltage that is higher than the first bias voltage to serve as the operation voltage of the microphone and to linearly transform the voice signal to a second output signal by the microphone, when the electronic device is operated in the normal operation mode; and
outputting the second output signal to a core circuit of the electronic device.

* * * * *